United States Patent

[11] 3,601,334

[72] Inventors Daniel J. Stark;
Leslie J. Bunting, both of Rochester, N.Y.
[21] Appl. No. 824,759
[22] Filed May 15, 1969
[45] Patented Aug. 24, 1971
[73] Assignee Eastman Kodak Company
Rochester, N.Y.

[54] REVIEW MECHANISM FOR SELF-THREADING MOTION PICTURE PROJECTORS
6 Claims, 8 Drawing Figs.

[52] U.S. Cl............................................. 242/192,
242/195, 242/205, 242/207
[51] Int. Cl....................................................... G11b 15/32,
G11b 15/66
[50] Field of Search.......................................... 242/192,
195, 197, 198, 199, 200, 201, 202, 203, 204, 205,
207, 206, 208, 209, 210; 352/72, 78, 157, 158;
282/71.1, 71.2

[56] References Cited
UNITED STATES PATENTS
3,254,856  6/1966  Camras ....................... 242/188
3,468,498  9/1969  Bunting ....................... 242/207

Primary Examiner—George F. Mautz
Attorneys—Robert W. Hampton and G. Herman Childress ABSTRACT: In a motion picture projector of the type provided with film-threading members operable by a rotatable cam member, a review mechanism includes means for disabling movement of the threading members so that rotation of the cam member can be employed to recock a spring-actuated film rewinding mechanism after the film has been only partially rewound, thereby allowing repetition of a selected scene sequence.

DANIEL J. STARK
LESLIE J. BUNTING
INVENTORS

DANIEL J. STARK
LESLIE J. BUNTING
INVENTORS

BY J. Herman Childress
Robert W. Hampton
ATTORNEYS

DANIEL J. STARK
LESLIE J. BUNTING
INVENTORS

DANIEL J. STARK
LESLIE J. BUNTING
INVENTORS

BY G. Herman Childress
Robert W. Hampton
ATTORNEYS

REVIEW MECHANISM FOR SELF-THREADING MOTION PICTURE PROJECTORS

CROSS-REFERENCE TO RELATED APPLICATIONS

Reference is hereby made to commonly assigned U.S. Pat. application Ser. No. 685,616 entitled "Cinematographic Projectors or the Like and Cartridges for Use Therewith," filed in the names of John J. Bundschuh and Robert J. Roman on Nov. 24, 1967, and to commonly assigned U.S. Pat. application Ser. No. 819,769, entitled "Control Device for Self-Threading Motion Picture Projector," filed in the name of Leslie J. Bunting on Apr. 28, 1969.

BACKGROUND OF THE INVENTION

1. Field of the Invention

The present invention relates to review mechanisms for use in self-threading motion picture projectors of the type disclosed in commonly assigned U.S. Pat. application Ser. No. 685,616 entitled "Cinematographic Projectors of the Like and Cartridges for Use Therewith," filed in the names of John J. Bundschuh and Robert J. Roman on Nov. 24, 1967, and in commonly assigned U.S. Pat. application Ser. No. 819,769, entitled "Control Device for Self-Threading Motion Picture Projector," filed in the name of Leslie J. Bunting on Apr. 28, 1969. More particularly, the invention relates to the provision of such a projector with a review mechanism including means for disabling the movement of the threading members of the projector so that the rotatable cam which operates those members can be employed to recock a spring-actuated film rewinding mechanism after the film has been only partially rewound, thereby allowing repetition of a selected scene sequence.

2. Description of the Prior Art

The film-threading mechanism incorporated in the type of cartridge loaded motion picture projector disclosed in the above-identified U.S. Pat. applications includes a drive member (i.e. a belt) and a finger member movably supported in radial alignment with the rotatable film supply reel in the film cartridge mounted on the projector. During the film threading phase of the projector's operating cycle, the rotation of a cam member to a predetermined intermediate position causes the drive member and the stripper finger to move into peripheral engagement with a roll of film carried by the rotatable film supply reel. Consequently, as the supply roll is driven in an unwinding direction by the drive member, the leading end of the film is separated from the roll by the stripper finger and is delivered into a projection gate in which it is engaged by a film advancing member. When the threading operation has been completed, the cam member rotates further in the same direction to its predetermined initial position and thereby retracts the drive member and the stripper finger to their respective inoperative positions, where they remain until the next threading operation is performed.

After all of the available film has been displayed, the trailing end of the film is drawn taut between the film-advancing member and the film supply reel. This increased tension in the film moves a film guide member to a position at which it releases the trigger member of a spring actuated automatic reversing mechanism. Thereupon, the release of the cocked automatic reversing mechanism opens the projector gate and shifts the drive clutch units associated with the film supply and takeup spindles so that the film is rewound through the gate onto the supply reel. During the threading of the next roll of film, the rotation of the previously mentioned cam member recocks the reversing mechanism, thereby closing the gate and restoring the clutch units to their projection mode of adjustment.

In order that the reversing mechanism will be recocked during the subsequent film threading operation, the rewinding operation effected by the actuation of the trigger member continues until the film is completely rewound. In many cases, however, the operator may wish to rewind only that portion of the film which he wishes to display again. Accordingly, the projector mechanism described in the aforementioned U.S. Pat. applications includes a manually operable "review" mechanism by means of which the operator can open the film gate and adjust the spindle clutches to rewind the film without releasing the spring actuated automatic reversing mechanism. However, in addition to increasing the cost of the projector by reason of the additional components involved, such a review mechanism is also rather undesirable in that its operation requires manual movement of an operating member in opposition to relatively heavy resilient resistance (i.e. a spring), thus demanding considerable manual effort by the operator which must be sustained until the desired amount of film has been rewound. Additionally, failure to move the operating member all the way to its operative position can result in malfunctioning of the projector and in possible damage to the film.

SUMMARY OF THE INVENTION

In accordance with the present invention, a projector of the type just described is provided with a review mechanism including a manually movable review-rewind member adapted to operate the trigger member of the aforementioned automatic rewind mechanism. When the desired amount of film has been rewound, manual displacement of an easily movable review projection member causes the cam member to rotate through a complete rotational cycle, thus terminating the partial film-rewinding operation and recocking the reversing mechanism. Simultaneously, such movement of the review projection member disables the drive member and the stripper finger from moving into engagement with the film roll. Accordingly, the power required to adjust the film gate and clutch units is derived from the power driven cam member without necessitating any significant manual effort on the part of the operator. Furthermore, the review-rewind and review projection members need be only momentarily actuated to insure proper functioning of the machine, thus eliminating the need for the operator to hold those members in their operative positions.

The invention, and its objects and advantages, will become more apparent in the detailed description of the preferred embodiment of the invention presented below.

BRIEF DESCRIPTION OF THE DRAWINGS

In the detailed description of the preferred embodiment of the invention presented below, reference is made to the accompanying drawing, in which.

DESCRIPTION OF THE ILLUSTRATIVE PREFERRED EMBODIMENT

General Description

Because motion picture projectors are well known, the present description will be directed in particular to elements forming part of, or cooperating more directly with, the present invention, projector elements not specifically shown or described herein being understood to be selectable from those known in the art.

The cartridge-loaded motion picture projector partially illustrated in the accompanying drawings is similar to the one described more specifically in the above-identified U.S. Pat. applications; however, various components of the previously disclosed machine that do not relate directly to understanding the present invention have been omitted. It will be understood, however, that such components are completely compatible with the subject control device and have been deleted from the present disclosure only for purposes of clarity.

Figure 1:
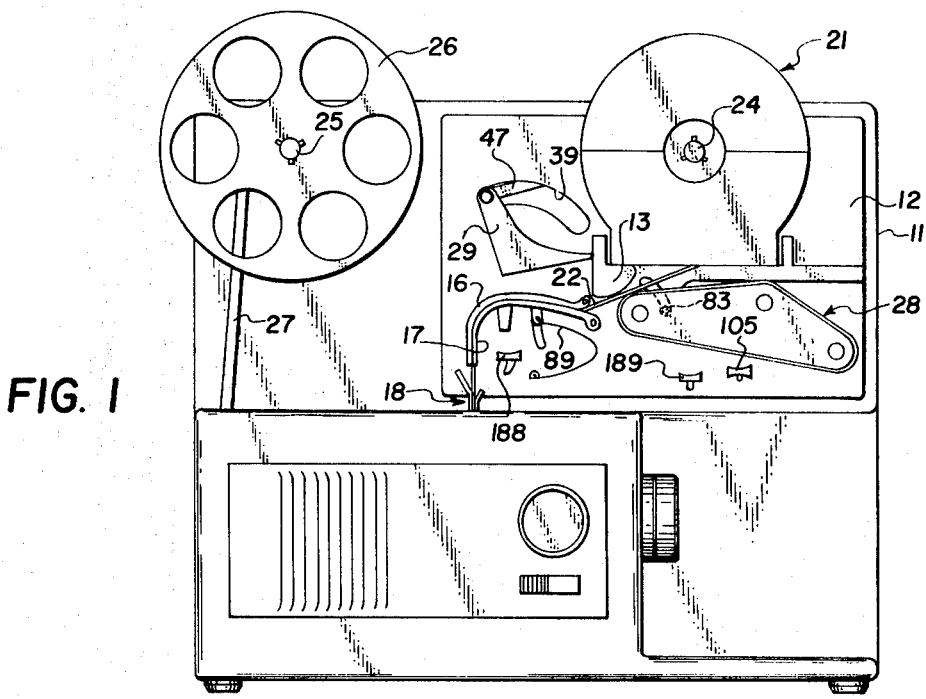
FIG. 1 is a side elevational view of a self-threading cartridge loaded motion picture projector of the type adapted to incorporate the present invention.
Figure 2:
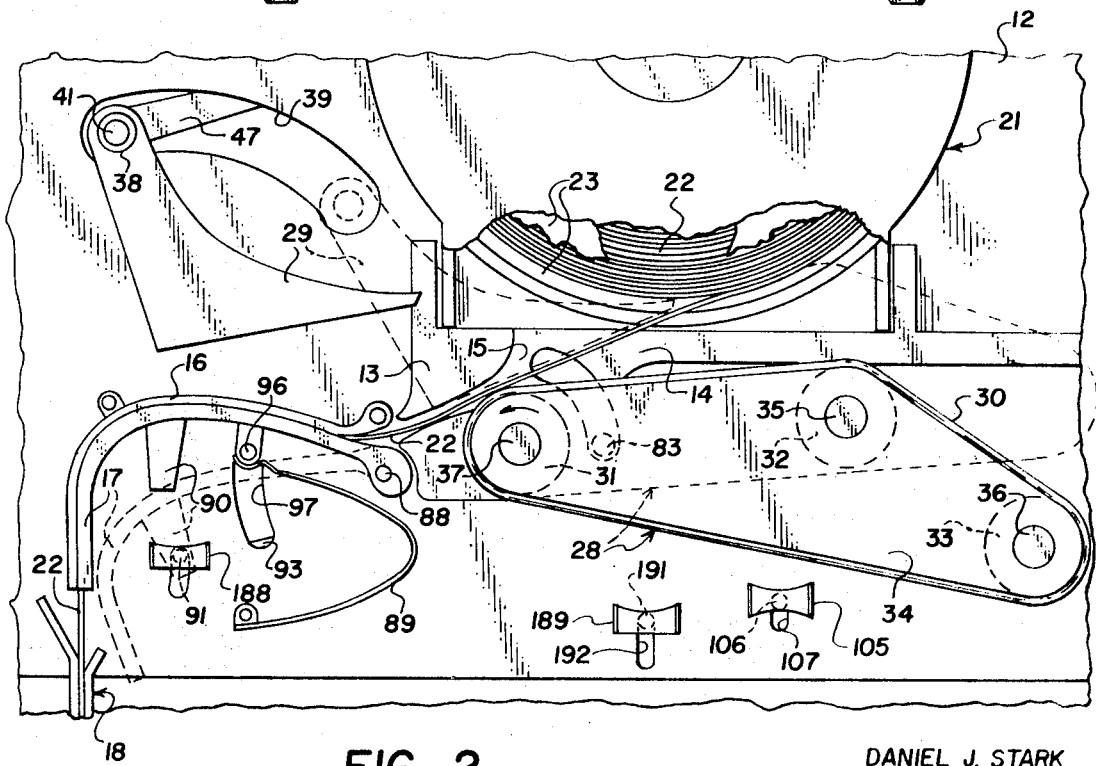
FIG. 2 is an enlarged fragmentary view, partially in section, of a portion of the projector shown in FIG. 1 illustrating external components of the film stripping and threading mechanism of the subject projector.
Figure 4:
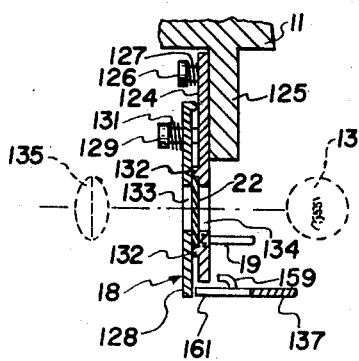
FIG. 4 is a cross-sectional top view of the film gate of the projector in its closed condition.
Figure 5:
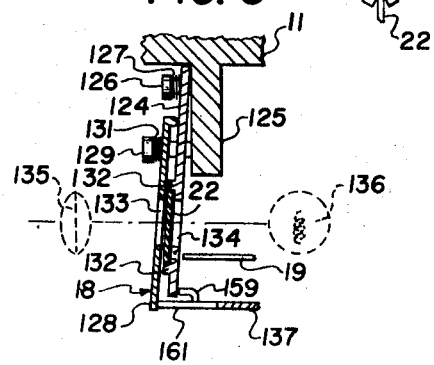
FIG. 5 is a view corresponding to FIG. 4 but illustrating the film gate in its open condition.

As best shown in FIGS. 1 and 2, the illustrative projector comprises a generally rectilinear external casing member 11 provided with a vertical frame plate 12 including film guide bosses 13 and 14 which define a film guide channel 15 leading into a film passageway defined between stationary guide shoe 16 and pivotal guide shoe 17. The lower end of the film passageway defined between the two guide shoes is located directly above a generally conventional film gate 18 provided with a film-advancing member depicted by pulldown claw 19 (FIGS. 4 and 5). As shown at numeral 21, the projector is adapted to be loaded with a film cartridge releasably attached to frame plate 12. Within the cartridge, a roll of film 22 is wound onto a film supply reel 23, which is supported for rotation by a rotatable spindle 24. A similar spindle 25 rotatably supports a film takeup reel 26, to which film is conducted by suitable means depicted as a guide 27.

When the film cartridge is mounted on the projector, the leading end of the film must be separated from the film roll and fed along the path defined by the film guide bosses and the guide shoes in order that it will enter the film gate and will be engaged by the film pulldown claw, which thereafter propels it automatically into engagement with the hub of the film takeup reel 26. As previously mentioned, this operation is performed by a film stripping and threading mechanism comprising drive member 28 and stripper finger 29.

Film Stripping and Threading Mechanism

Drive member 28 comprises an endless elastic belt 30 of circular cross section encircling three pulleys 31, 32 and 33 supported in coplanar relation to one another between two parallel pulley support plates, one of which is shown at 34 in FIG. 2. Pulleys 32 and 33 are freely rotatable about their respective pivot studs 35 and 36 extending between the two support plates. Pulley 31, however, is supported by drive shaft 37, which is constantly driven by appropriate drive means, not shown, thereby causing that pulley to rotate constantly in a counterclockwise direction as viewed in FIGS. 1 and 2 or in a clockwise direction as viewed in FIGS. 3, 6, 7 and 8. The two pulley support plates are journaled to the drive shaft adjacent opposite faces of pulley 31 and thereby allow the drive member to pivot between its inoperative position shown in solid lines in FIGS. 1 and 2 and an operative position at which its moving belt 30 is in pivotal engagement with the roll of film on reel 23, as shown in broken lines in FIG. 2. Accordingly, when the drive member is moved to its operative position, as described below, it imparts unwinding rotation to the film roll.

Stripper finger 29 is pivotally supported by a sleeve member 38 extending through an elongate slot 39 in frame plate 12. The sleeve member, in turn, is supported by a pin 41 on stripper arm 42, which is pivotally mounted on stud 43. Guide roller 44 on pin 41 engages the arcuate edge 45 of stationary cam plate 46 to assist in maintaining arm 42 in parallel relation to plate 12 as the arm rotates arcuately about stud 43.

Cam follower arm 47 is also carried by sleeve member 38 in fixed angular relation to the stripper finger and includes a cam follower lip 48 biased toward cam surface 49 on the cam plate by a spring 51. Accordingly, as the stripper arm pivots about stud 43 to move the stripper finger into contact with the film roll, the initial path movement of the stripper finger is determined by cam surface 49. Thus, regardless of the size of the film supply roll, the lower edge of the stripper finger will assume a position generally parallel to the adjacent portion of the drive belt when both the finger and the belt are engaged with the film roll, thereby defining the film passageway leading into channel 15. Since the film roll is being rotated in an unwinding direction by the belt while it is engaged by the stripper finger, the leading end of the film engages the finger and thereby is separated from the roll and delivered along the threading path.

Figure 3:
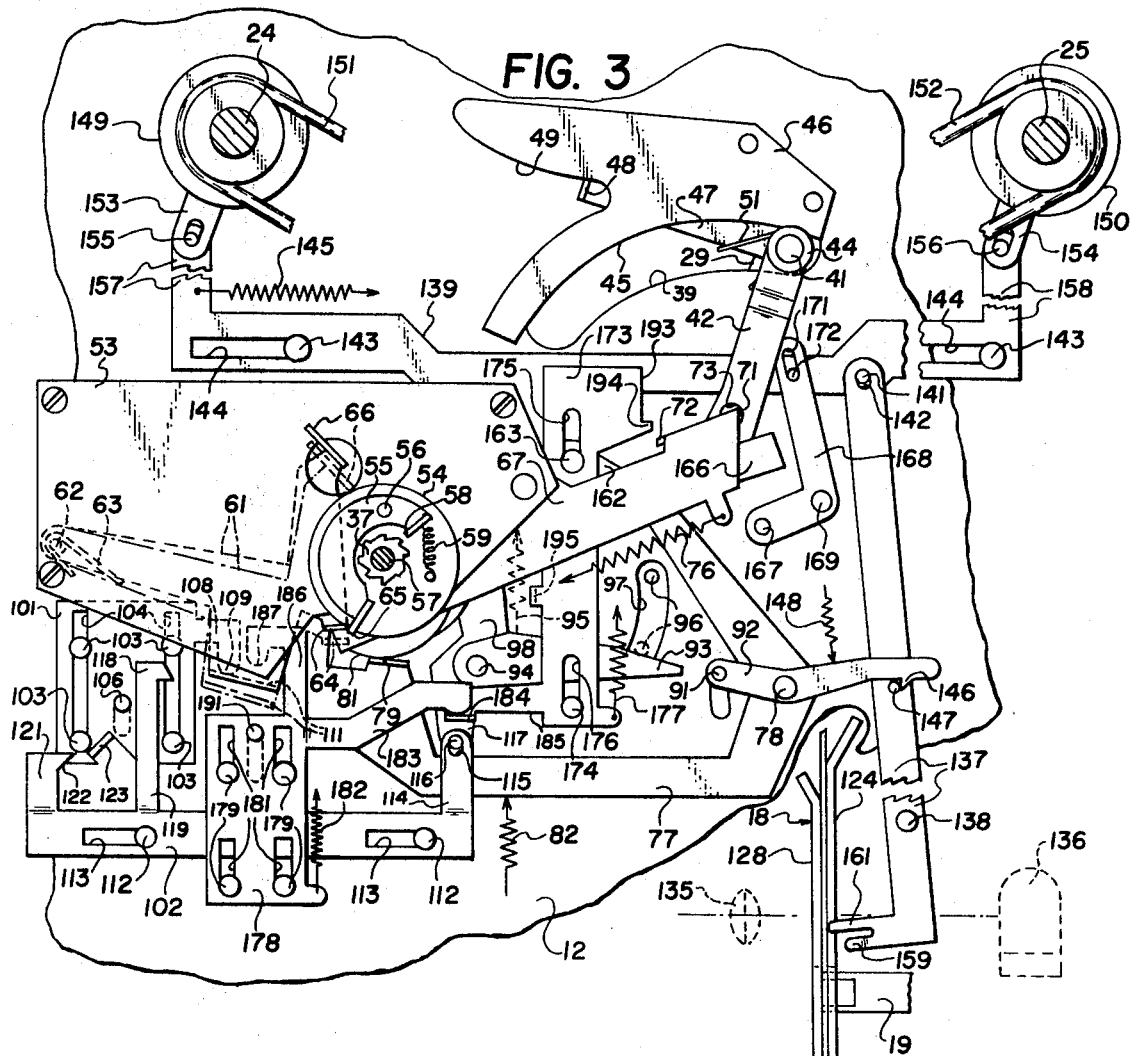
FIG. 3 is a somewhat schematic elevational view of a portion of the projector shown in FIGS. 1 and 2, taken from inside the projector to show the internal components thereof in the respective positions which they assume after a film threading operation has been completed.

The mechanism employed to move the drive member and the stripper member sequentially into engagement with the film roll is illustrated in FIGS. 3, 6, 7 and 8 and comprises a three-lobed cam member 52 rotatably supported on drive shaft 37 between frame plate 12 and carrier plate 53 (FIG. 3). Disk member 54 is attached to cam member 52 and carries a dog member 55 pivotally supported on the disk member by pin 56. A toothed hub member 57 is affixed to drive shaft 37 adjacent disk member 54 and is adapted to be engaged by ear 58 of the dog member, which is biased toward the hub member by a spring 59. A clutch operating lever 61 is pivoted to plate 53 by pin 62 and is biased upwardly by spring 63. When the clutch-operating lever is in its raised position, shown in broken and solid lines in FIG. 3 and its lower ear 64 is in contact with the edge of disk 54 and engages lip 65 projecting outwardly from dog member 55. Consequently, the dog member is held in its depicted position with its ear 58 out of engagement with hub member 57, thereby disengaging the cam member from the drive shaft so that the cam member remains stationary. Upon movement of the clutch operating member to its depressed position shown in phantom lines in FIG. 3, ear 64 disengages lip 65 as ear 66 simultaneously moves downwardly into contact with the disk member. Accordingly, dog member 55 immediately pivots a out pin 56 under the influence of spring 59 to engage ear 58 with hub member 57, thereby coupling the cam member to drive shaft 37. As soon as the cam has rotated through an angle of approximately 120°, however, the corresponding rotation of disk 54 brings lip 65 into contact with ear 66, whereupon the cam member is again immobilized at its intermediate position by the disengagement of the dog ear from the hub member. Thereafter, movement of the clutch-operating member back to its former position similarly causes the cam member to be driven through an angle of approximately 240° to restore it to its initial position.

The position of stripper arm 42 is determined by cam member 52 by means of slide bar 67, which is supported at one end by legs 68 straddling cam hub 69 and at its opposite end by an L-shaped ear 71 extending beyond lip 72 and received in hole 73 in stripper arm 42. Cam follower ear 74, located between the legs of the slide bar, is urged toward engagement with the periphery of cam lobe 75 by spring 76. Similarly, the position of drive member 28 is controlled by the cam member through the agency of control lever 77, which is pivoted to support stud 78 and provided with a cam follower ear 79 biased toward engagement with cam lobe 81 by spring 82. A positioning stud 83, rigidly attached to the drive member, is received in a slot 84 at the corresponding end of the control lever, thereby correlating the position of the drive member with that of the control lever.

Figure 6:
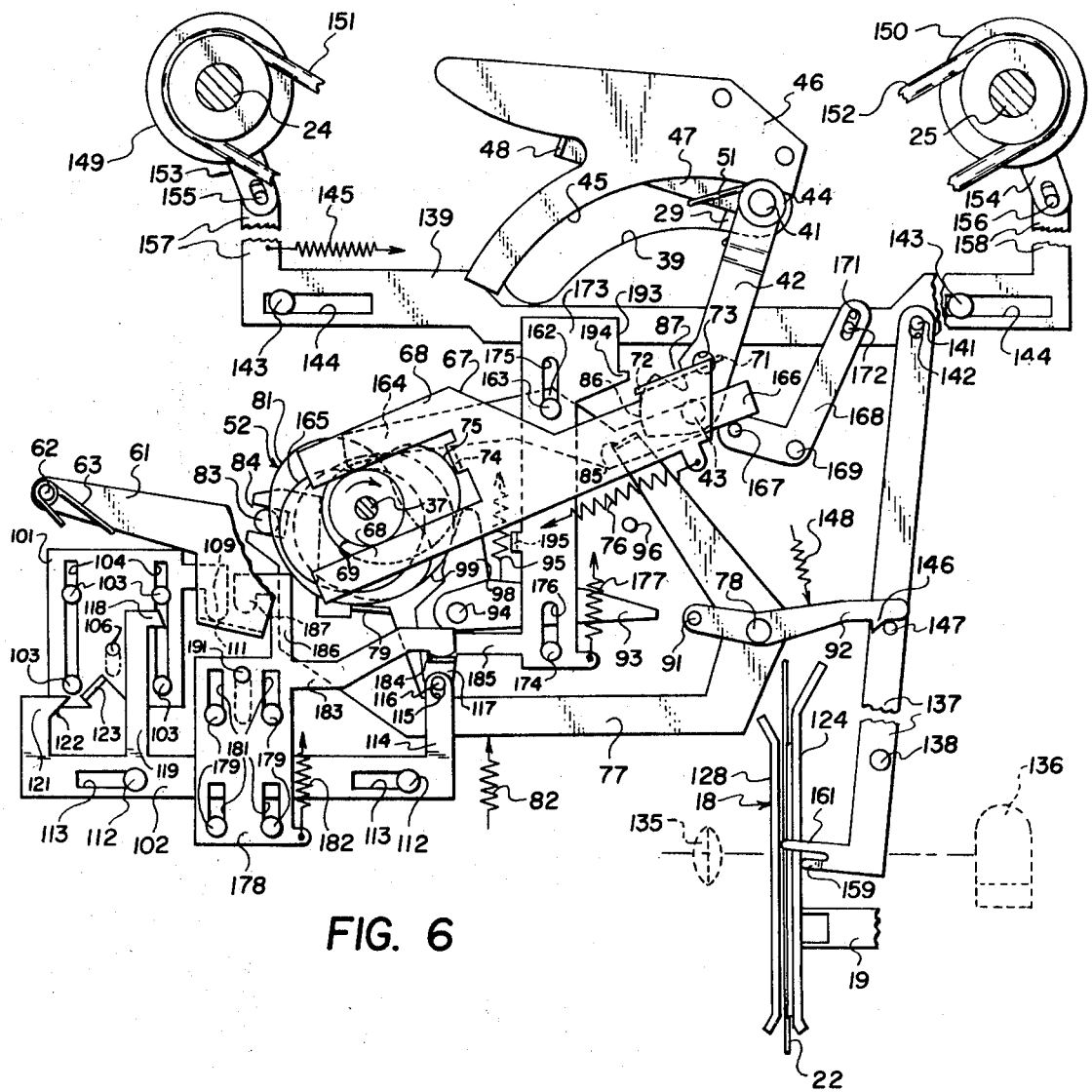
FIG. 6 is a somewhat schematic view from the same viewpoint as FIG. 3, depicting the relative positions of the illustrated components while the film is in the process of being completely rewound onto the film supply reel.

Except during the film stripping and threading operation, the cam member is angularly oriented as shown in FIG. 6 by the engagement of the lower clutch lever ear 64 with dog member lip 65, whereby the drive member and the stripper finger are retained in their respective inoperative positions. Upon movement of the control lever to its lower position shown in phantom lines in FIG. 3 and in solid lines in FIG. 7, the resulting rotation of the cam member to its intermediate position depicted in the latter figure allows the slide bar to effect movement of the stripper finger into operative engagement with the film roll. Simultaneously, cam lobe 81 also presents a decreasingly smaller radius to cam follower ear 79 of control lever 77. At the opposite end of that lever, an ear 85 thereon is in alignment with the curved edge surface 86 of stripper arm 42. Therefore, as the cam member commences its rotational movement from its initial position, lever 77 is blocked by the engagement of ear 85 with surface 86, allowing cam lobe 81 to move out of engagement with cam follower ear 79. By the time the cam member reaches its intermediate position, however, the movement of stripper arm 42 by slide bar 67 has brought the stripper finger to its operative position and has aligned notch 87 in the stripper arm with ear 85. Thus, since ear 85 is no longer blocked, spring 82 can now pivot the slotted end of the control lever upwardly to thereby rotate the drive member about shaft 37 into resilient driving engagement with the film roll within the film cartridge.

During the projection of the film, the lower film guide shoe 17 is free to pivot downwardly about its support pin 88 against the influence of a relatively weak leaf spring 89 to absorb momentary fluctuations in film tension. The trailing end of the film is attached to the film supply reel so that the film is drawn taut between the gate and that reel when all of the available film has been displayed. When this occurs, the lower guide shoe is pivoted to its lowermost position shown in broken lines in FIG. 2 so that its foot member 90 engages and depresses pin 91 of trigger member 92 to initiate the rewinding of the film by effecting automatic adjustment of a rewind mechanism as described in detail below. During the film stripping and threading operation, however, the lower guide shoe must be retained in its raised position with greater force than that afforded by spring 89 in order to insure that the leading end of the film strip will be guided positively into the film gate. This is accomplished by means of snubber arm 93, which is biased upwardly about pivot pin 94 by spring 95 to urge it toward engagement with pin 96 projecting from the lower guide shoe through arcuate slot 97 in frame plate 12. A cam follower ear 98 on arm 93 is adapted to engage lobe 99 on cam member 52, which holds the arm in its operative position shown in FIGS. 3 and 6 whenever the cam member is in its initial position. As the cam member rotates to its intermediate position, as previously described, the decreased radius of the portion of cam lobe 99 adjacent cam follower ear 98 allows spring 95 to pivot arm 93 upwardly into contact with pin 96 so that the lower film guide shoe is urged upwardly under the combined force of springs 89 and 95.

Threading Control Device

For purposes of controlling the film-threading operation, the position of clutch operating lever 61 is established by a control device comprising operating slide 101 and latching slide 102. The operating slide is supported for vertical sliding movement by rivets 103 extending through elongate slots 104 therein and is moved manually by means of slide button 105 carried by pin 106 projecting through vertical slot 107 in the frame plate. Arm 108 extends laterally from the operating slide with its depending nose 109 positioned above lip 111 of the clutch operating lever so that manual downward movement of the slide button moves that lever to its lower position in opposition to spring 63 to initiate rotation of the cam member from its initial position to its intermediate position.

Figure 8:
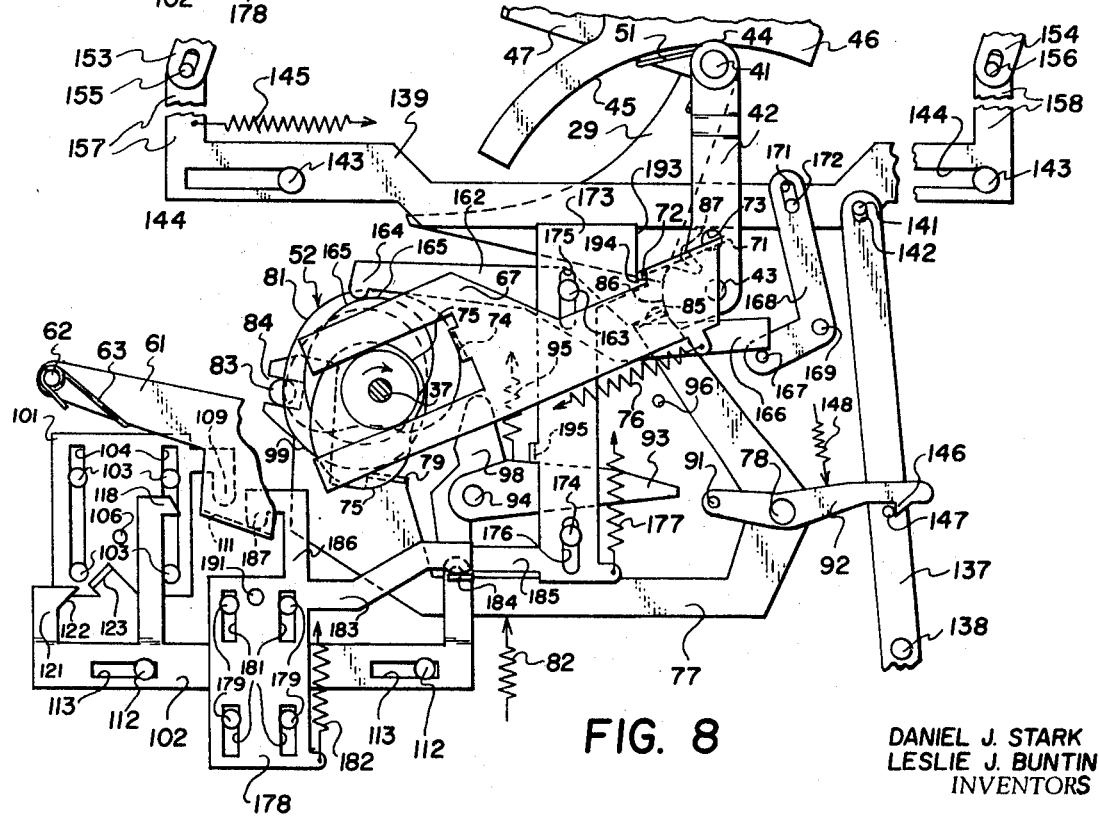
FIG. 8 corresponds to FIG. 7 and depicts the relative positions of the illustrated components during the gate and clutch adjusting operation performed when the portion of the film to be reviewed has been rewound through the projection gate.

Latching slide 102 is supported for horizontal sliding movement by rivets 112 extending through horizontal slots 113 and includes a vertical tongue 114 provided with an elongate hole 115 which receives a pin 116 carried by tongue 117 of snubber arm 93. Accordingly, when the cam member is in its initial position, the corresponding angular location of the snubber arm positions the latching slide as shown in FIGS. 3, 6 and 8. In this position, latch tooth 118 at the top end of vertical arm 119 of the latching slide is beyond the arcuate path of movement of lip 111 of the clutch-operating lever.

When the operator manually depresses slide button 105, the clutch-operating lever is pivoted downwardly, as previously explained, thereby initiating rotation of the cam member to its intermediate position. As such rotation proceeds, cam lobe 99 pivots snubber arm 93 to the position shown in FIG. 7, as also explained above, and in so doing moves latching slide 102 to the position shown in that same figure so that latch tooth 118 engages lip 111 and holds the clutch operating lever in its lower position in opposition to spring 63. Thus, as soon as such engagement of tooth 118 with lip 111 has been established, the operator can release slide button 105 without interrupting the continuing performance of the film stripping and threading operation.

During the film stripping and threading operation, the lower film guide shoe is maintained adjacent the upper film guide shoe under the combined influence of springs 89 and 95 to establish a passageway along which the film is directed through the film gate. When the completion of the film stripping and threading operation has brought the leading end of the film into engagement with claw 19, the longitudinal movement imparted to the film by the claw exceeds the rate at which the film can be unwound from the film roll, which is established by the engagement of the slower moving drive belt with the film. Therefore, sufficient tension is developed in the film between the gate and the film cartridge to pivot guide shoe 17 downwardly by overpowering both leaf spring 89 and also spring 95, which biases the snubber arm cam follower ear toward engagement with the cam member. Before guide shoe 17 is thus pivoted downwardly to the position at which it initiates the film rewinding operation, however, the accompanying rotation of the snubber arm displaces the latching slide to disengage tooth 118 from lip 111; thereby allowing spring 63 to raise the clutch-operating lever so that the cam member will return to its initial position by completing a single revolution. Consequently, the illustrated mechanism is restored automatically to the condition depicted in FIGS. 3 and 6 to allow the projection of the film to proceed.

Figure 7:
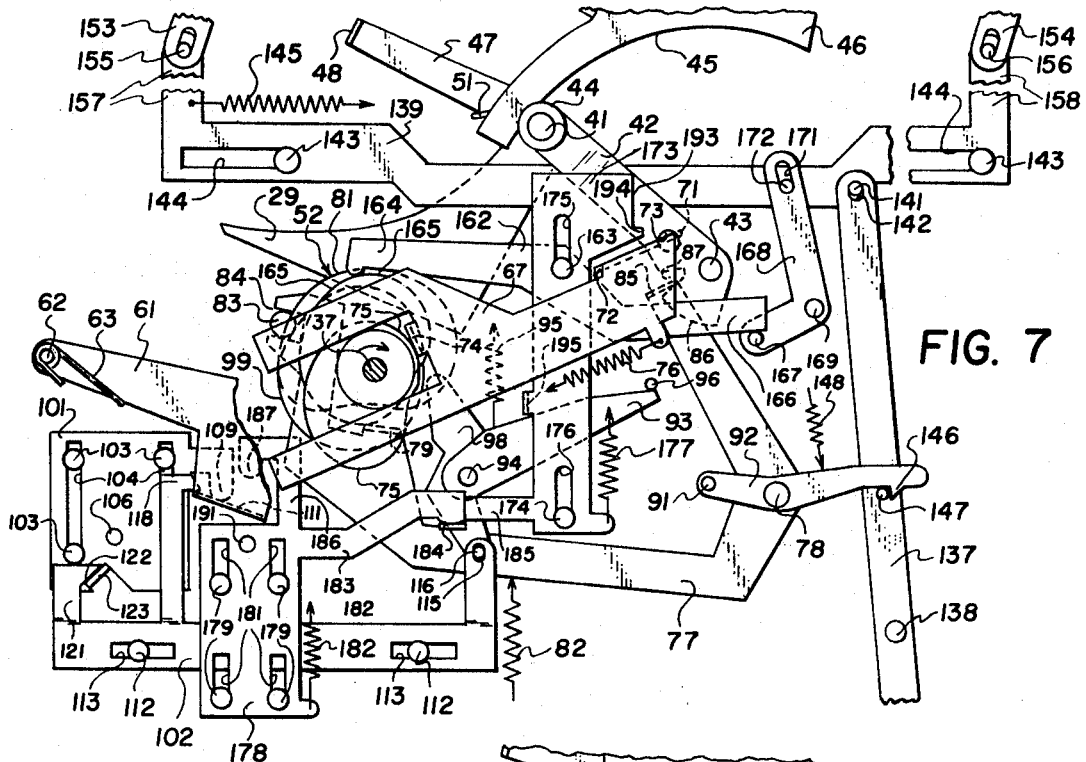
FIG. 7 corresponds generally to FIG. 6 and shows the relative positions of the illustrated components during the film threading phase of the projector's operating cycle.

To enable the operator to discontinue the film stripping and threading operation manually, latching slide 102 includes a release arm 121 provided with a sloped cam face 122, which is positioned immediately adjacent the correspondingly sloped cam lip 123 on operating slide 101 when the projector mechanism is adjusted to the condition shown in FIG. 7. If the operator manually lifts slide button 105, the upward movement of the operating plate therefore causes cam lip 123 to cam the latching slide out of latching engagement with lip 111 of the clutch operating lever in opposition to spring 95. Consequently, the clutch operating lever is returned to its raised position by spring 63 to enable the cam member to restore the mechanism to its initial condition in the same manner previously described.

Film Gate and Spindle Adjustment

As best depicted in FIGS. 3, 4 and 5, the film gate 18 comprises an aperture plate 124 attached to a shoulder 125 of casing member 11 by vertically aligned mounting rivets 126 and urged to the position shown in FIG. 4 by springs 127 beneath the heads of the mounting rivets. A pressure plate 128 is similarly attached to the aperture plate by rivets 129 and is urged resiliently toward the latter plate by springs 131. Accordingly, when the gate is closed as shown in FIGS. 3 and 4, the film received therein between guide ribs 132 is sandwiched between the two gate plates as it is moved intermittently past aligned apertures 133 and 134 along the optical axis of objective lens 135 and projection lamp 136. The conventional film pulldown claw 19 is adapted to move into and out of engagement with the film through slots in the two gate plates to thereby advance the film in the manner well known in the projector art.

Adjusting lever 137 is pivotally mounted to frame plate 12 by stud 138 and is connected at its top end to clutch adjusting slide 139 by pin 141 projecting through slot 142. The clutch-operating slide is supported for horizontal sliding movement by support studs 143 extending through elongate slots 144 and is biased in a rearward direction by a relatively strong spring 145. Trigger member 92 is pivotally carried by support stud 78 and includes a latch tooth 146 which releasably engages latch pin 147 on lever 137 under the influence of spring 148 to releasably retain lever 137 and slide 139 in their respective positions shown in FIG. 3, in opposition to the influence of spring 145.

The two reel spindles 24 and 25 are provided with respective clutch units 149 and 150 connected by corresponding belts 151 and 152 to a drive motor, not shown. The two clutch units, in turn, are provided with respective control arms 153 and 154, which are connected by pins 155 and 156 to corresponding vertical legs 157 and 158 of slide 139. Therefore, as long as trigger member 92 holds slide 139 in the position shown in FIG. 3, the clutches are adjusted to wind the film from the film supply reel to the film takeup reel. When the trigger member has been disengaged from pin 147 by downward movement of trigger lever pin 91, however, spring 145 moves slide 139 to the position shown in FIG. 6 and thereby adjusts the clutch units to rewind the film onto the film supply reel.

At its lower end, lever 137 is provided with fingers 159 and 161, which are aligned respectively with the corresponding edges of aperture plate 124 and pressure plate 128. As shown in FIGS. 3 and 4, these fingers are out of contact with the two gate plates whenever trigger member 92 is in latching engagement with lever 137, thereby allowing the gate to remain in its closed condition. During a film-rewinding operation, however, the movement of lever 137 to the position shown in FIG. 6 causes fingers 159 and 161 to engage the corresponding edges of the aperture and pressure plates. Consequently, both gate plates are rocked forwardly as best shown in FIG. 5, thereby releasing the pressure on the film and moving it beyond the path of movement of the pulldown claw.

After a film-rewinding operation has been completed, lever 137 must be returned to the position shown in FIG. 3 in opposition to spring 145 in order to close the gate and to readjust the clutch units so that film can again be wound from the supply reel toward the takeup reel. To perform this resetting operation, reset lever 162 is centrally supported for pivotal movement by support pin 163 with its forwardly extending leg 164 located directly above a fourth cam lobe, 165. The rearwardly extending leg 166 of the reset lever projects above a pin 167 carried by a cocking lever 168 pivotally supported to the frame plate by stud 169. The upper end of the cocking lever is provided with an elongate slot 171 which receives a pin 172 mounted to slide 139. As the cam member rotates from its initial position to its intermediate position, the periphery of cam lobe 165 causes the rearwardly extending leg of the reset lever to pivot the cocking arm to the position shown in FIG. 7. Accordingly, slide 139 and lever 137 are returned to their cocked positions where they are releasably retained in opposition to spring 145 by the reengagement of trigger latch tooth 146 with latch pin 147. Thereafter, as the cam member continues to rotate through the remainder of a single revolution, the radius of cam lobe 165 engaged by reset lever leg 164 decreases, allowing the reset to be restored to the position shown in FIG. 3.

Review Mechanism

The review mechanism to which the present invention specifically relates includes a disabling slide 173 supported for vertical sliding movement by support pins 163 and 174 projecting from frame plate 12 through corresponding elongate slots 175 and 176. A spring 177 biases the disabling slide toward its inoperative position depicted in FIGS. 3, 6 and 7. In that position, the disabling slide is beyond the paths of movement of the various operative projector elements previously described and therefore has no influence on the performance of the projector mechanism.

Actuating slide 178 is likewise supported on the frame plate for vertical sliding movement by studs 179 extending through elongate slots 181, and is similarly biased toward its raised position shown in FIGS. 3, 6 and 7 by spring 182. As shown at numeral 183, an arm extends laterally from the actuating slide and is positioned directly above a lip 184 carried by a similar arm 185 of the disabling slide. Another arm, 186, extends upwardly from the actuating slide and includes a depending nose 187 located above lip 111 of clutch operating lever 61.

To initiate partial rewinding of the film, the operator manually releases trigger member 92 from latch pin 147 on lever 137 by depressing review rewind button 188 carried by the external end of trigger member pin 91, as shown in FIG. 2; whereupon the film gate is opened and the film is rewound onto the film supply reel as previously described. As soon as the desired amount of film has been rewound, the operator then momentarily depresses a review projection button 189, also shown in FIG. 2, which is supported by pin 191 extending from actuating slide 178 through slot 192 in frame plate 12. Accordingly, actuating slide 178 is moved in opposition to spring 182 to its lowermost position shown in FIG. 8, thereby causing arm 183 to move disabling slide 173 to its operative position shown in the same figure. Simultaneously, the nose 187 of actuating slide arm 186 engages lip 111 of the clutch-operating lever and pivots the latter downwardly to initiate rotation of the cam member. However, since the disabling slide 173 is now in its operative position, slide bar 67 can move only a short distance in response to rotation of cam lobe 75 before being blocked by the engagement of its lip 72 with edge surface 193 of the disabling slide. Consequently, stripper arm 42 remains in the position shown in FIG. 8 as the cam member continues to rotate, thereby maintaining stripper finger 29 beyond engagement with the film on the supply reel. Also, since the stripper arm cannot move sufficiently to align its notch 87 with ear 85 at the adjacent end of control lever 77, the drive member is likewise maintained in its inoperative position notwithstanding the rotation of the cam member.

As soon as the cam member has rotated sufficiently to bring lip 72 of slide bar 67 into engagement with surface 193 of the disabling slide, the operator can release button 189 so that spring 182 can return the actuating slide 178 to its raised position; thereby allowing clutch operating lever 61 to be pivoted upwardly by spring 63 so that the cam member will complete a single revolution without interruption. However, due to the engagement of disabling slide tooth 194 with lip 72 of slide bar 67, the disabling slide remains temporarily in the position shown in FIG. 8.

Upon rotation of the cam member past its intermediate position, cam lobe 165 causes reset lever 162 to recock the film gate and clutch-adjusting mechanism, thus closing the gate and adjusting the spindle clutches so that the previously rewound portion of the film is again projected. Thereafter, as the cam member continues to rotate to its initial position, cam lobe 75 reengages cam follower ear 74 of slide bar 67 and moves the latter sufficiently to disengage lip 72 from disabling slide tooth 194, whereupon spring 95 returns the disabling slide to its inoperative position to restore the entire mechanism to its previous condition.

As shown at numeral 195, an ear is also provided on the disabling slide above snubber arm 93 so that the latter is blocked from pivoting upwardly beyond the position shown in FIG. 8 whenever the disabling slide is in its operative position. If the operator should continue to depress button 189 until the cam member reaches its intermediate position, this feature therefore insures that latch tooth 118 of the latching slide cannot move into engagement with the depressed clutch-operating lever. Accordingly, as soon as the operator releases button 189, the clutch lever will return to its raised position to allow the cam member to complete its rotation to its initial position.

The invention has been described in detail with particular reference to a preferred embodiment thereof, but it will be understood that variations and modifications can be effected within the spirit and scope of the invention.

We claim:

1. In a motion picture projector having:
   a. means for receiving a supply roll of film having a leading end;
   b. a film takeup;
   c. a film drive mechanism shiftable between
      1. a first condition for advancing film from a received supply roll to the takeup, and
      2. a second condition for advancing film from the takeup to the supply roll;
   d. first actuatable means for shifting said drive mechanism from its second condition to its first condition;
   e. a threading device movable between
      1. a first position wherein said device is out of engagement with a received film supply roll, and
      2. a second position wherein said device is in engagement with a received film supply roll to effect removal of the leading end of the film from the roll; and
   f. means for moving said threading device to its second position in response to said drive mechanism being shifted to its first condition; the improvement comprising:
   g. second actuatable means for shifting said drive mechanism from its second condition to its first condition, and
   h. disabling means movable from a first position to a second position in response to actuation of said second shifting means for preventing movement of said threading device from its first position to its second position.

2. The improvement defined in claim 1 further comprising:
   a. means biasing said disabling means toward its first position;
   b. retention means engageable with said disabling means for retaining said disabling means in its second position; and
   c. means for disengaging said retention means from said disabling means in response to actuation of said first shifting means.

3. In a motion picture projector having:
   a. means for receiving a supply roll of film having a leading end;
   b. a film takeup;
   c. a film drive mechanism shiftable between
      1. a first condition for advancing film from a received supply roll to the takeup, and
      2. a second condition for advancing film from the takeup to the supply roll;
   d. first actuatable means for shifting said drive mechanism from its second condition to its first condition;
   e. a threading device movable between
      1. a first position wherein said device is out of engagement with a received film supply roll, and
      2. a second position wherein said device is in engagement with a received film supply roll to effect removal of the leading end of the film from the roll; and
   f. a power driven cam member movable to adjust said threading device between its first and second positions; the improvement comprising:
   g. second actuatable means for shifting said drive mechanism from its second condition to its first condition; and
   h. disabling means movable to a position in response to actuation of said second shifting means for preventing movement of said threading device from its first position to its second position during movement of said cam member.

4. The improvement defined in claim 3 further comprising:
   a. means biasing said disabling means toward its first position;
   b. retention means engageable with said disabling means for retaining said disabling means in its second position; and
   c. means for disengaging said retention means from said disabling means in response to actuation of said first shifting means.

5. The improvement defined in claim 4 wherein said second actuatable means comprises:
   a. a review projection actuating member movable from a first location to a second location to move said disabling means from its first position to its second position; and
   b. spring means for returning said review projection actuating member from its second location to its first location while said disabling means is retained in its second position by said retention means.

6. The improvement defined in claim 5 further comprising cam control means for initiating movement of said cam member in response to movement of said review projection actuating member to its second location.